(12) United States Patent
Lee et al.

(10) Patent No.: US 6,374,483 B1
(45) Date of Patent: Apr. 23, 2002

(54) PRODUCTION LINE OF AIR CONDITIONER

(75) Inventors: Sang-Yeol Lee; Hong-Rae Kim; Jong-Gweon Kim, all of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/597,844

(22) Filed: Jun. 20, 2000

(30) Foreign Application Priority Data

Aug. 5, 1999 (KR) ............................................ 99-32127

(51) Int. Cl.⁷ ................................................ B23P 15/26
(52) U.S. Cl. ........................... 29/726; 29/430; 29/33 P; 29/783; 29/791; 29/799; 29/822
(58) Field of Search ........................ 29/726, 786, 33 P, 29/33 K, 783, 787, 799, 785, 791, 792, 793, 794, 795, 822, 890.035, 890.07, 429, 430, 431; 198/602; 700/216, 95

(56) References Cited

U.S. PATENT DOCUMENTS

| | | | |
|---|---|---|---|
| 4,104,890 A | | 8/1978 | Iwasaki |
| 4,228,573 A | | 10/1980 | Barnard |
| 4,683,651 A | * | 8/1987 | Taketani et al. ............... 29/792 |
| 4,713,883 A | | 12/1987 | Santandrea et al. |
| 4,884,330 A | * | 12/1989 | Sticht ........................... 29/430 |
| 5,125,149 A | * | 6/1992 | Inaba et al. .................... 29/430 |
| 5,271,139 A | * | 12/1993 | Sticht ........................... 29/430 |
| 5,353,495 A | * | 10/1994 | Terabayashi et al. .......... 29/783 |
| 5,386,621 A | * | 2/1995 | Fluegge et al. ................ 29/705 |
| 5,632,155 A | | 5/1997 | Sugiyama et al. |
| 5,664,428 A | | 9/1997 | Sugiyama et al. |
| 5,689,965 A | | 11/1997 | Takenaka et al. |
| 5,727,301 A | * | 3/1998 | Kugo ........................... 29/430 |
| 5,927,464 A | | 7/1999 | Clark et al. |
| 6,038,521 A | * | 3/2000 | Kanai .......................... 702/121 |

* cited by examiner

*Primary Examiner*—I Cuda Rosenbaum
*Assistant Examiner*—T. Nguyen
(74) *Attorney, Agent, or Firm*—Robert E. Bushnell, Esq.

(57) ABSTRACT

A production line of an air conditioner mounted with a work bench for mass-producing indoor units and outdoor units, the work bench including a pallet supply section; an outdoor unit work part mounted at one side of the pallet supply section with a parts assembly section, refrigerant tube vacuum forming and refrigerant infusion section, refrigerant infusion tube removal section, control unit assembly section, refrigerant leakage inspection section, cabinet assembly section, packing section, forwarding and loading section in that order; an indoor unit work part mounted at the other side of the pallet supply section with first pallet feeding section, parts assembly section, noise inspection section, second pallet feeding section, packing section and forwarding and loading section in that order, and integrally installed from parts assembly section of the outdoor unit work part to cabinet assembly section; performance inspection section mounted between the cabinet assembly section and packing section of the outdoor work part and also mounted between the second pallet feeding section and the packing section of the indoor unit work part for simultaneously inspecting the outdoor units and indoor units in performance thereof, and finished products feeding and separating section mounted between the performance inspection section and packing section of the outdoor unit work part and also mounted between the performance inspection section and the packing section of the indoor unit work part for separating the outdoor units and indoor units from pallets and feeding the same.

22 Claims, 6 Drawing Sheets

PRODUCTION LINE OF AIR CONDITIONER

CLAIM OF PRIORITY

This application makes reference to, incorporates the same herein, and claims all benefits accruing under 35 U.S.C. §119 from an application entitled A Lot Production Line of Air Conditioner earlier filed in the Korean Industrial Property Office on Aug. 5, 1999, and there duly assigned Serial No.99-32127 by that Office.

BACKGROUND OF THE INVENTION

1. Field of the Invention

The present invention relates to a production line of an air conditioner, and more particularly to a production line of an air conditioner adapted to simultaneously produce an indoor unit and an outdoor unit at a common work bench.

2. Discussion of Related Art

Basically, an air conditioner includes a compressor, condenser, expansion valve, and evaporator. In a split system (or separate type) having an inside and outside unit, the outside unit will have a compressor and condenser. The expansion valve and evaporator will be in the inside unit. Both the inside and outside units are connected by a refrigerant tubing creating a loop.

Refrigerant vapor is compressed in a compressor to a higher pressure and temperature. It then goes to a condenser where it condenses to a liquid. It then enters the expansion valve and expands to a low temperature vapor and enters the evaporator and cools the air which is pushed through the evaporator with a fan in the inside unit. Refrigerant vapor then reenters the compressor. The above cycle then repeats over and over. The condenser is a refrigerant vapor and air heat exchanger in an air cooled condenser system. A second fan blows air through the condenser coil. It is very similar to a car radiator where a fan forces air through the radiator to cool the antifreeze. The evaporator is also a heat exchanger taking out the heat from the air to be supplied to the space to be air conditioned. The fan is used to move the air.

The indoor unit and the outdoor unit are independently manufactured and assembled at their respective production lines. Multiple work benches are stationed to do different aspects of the production line of an indoor unit placed on a pallet. In a totally separate production line for an outdoor unit, different work benches will be stationed for the production of the outdoor unit using a different set of pallets. The indoor unit and the outdoor unit have many distinctive components and the methods used ordinarily for the production of the units vary greatly. The vast differences have caused manufactures to have the separate production lines. However, by having separate lines, much space is lost and there is much more expense in maintaining two separate production lines. The time needed to produce a single lot of an indoor and outdoor unit is also increased.

An exemplar of the art is Sugiyama et al. (U.S. Pat. No. 5,632,155, Air Conditioning Apparatus with An Indoor Unit Incorporating a Compressor, May 27, 1997) discloses two unit air conditioning system. Other art also disclose two unit air conditioning systems such as in Takenaka et al. (U.S. Pat. No. 5,689,965, Air Conditioner, Nov. 25, 1997), Sugiyama et al. (U.S. Patent, Indoor Unit for an Air-Conditioning Apparatus, Sep. 9, 1997), Iwasaki (U.S. Pat. No. 4,104,890, Air Conditioning Apparatus, Aug. 8, 1978). Clark et al. (U.S. Pat. No. 5,927,464, Conveying Apparatus, Jul. 27, 1999) discloses background information on a conveying used in a production line. Kugo (U.S. Pat. No. 5,727,301, Assembly System for Assembling Product Comprising a Plurality of Parts, Mar. 17, 1998) discloses an assembly line in which many parts are assembled. Satandrea et al. (U.S. Pat. No. 4,713,883, Production Line for Pallet Mounted Electric Motor Stators, Dec. 22, 1987) gives background information on an assembly line for a mechanical device. Barnard (U.S. Pat. No. 4,228,573, Method for Assembling Heat Exchangers, Oct. 21, 1980) discloses a production line for rapidly assembling a heat exchanger.

I have found that none of the exemplar art teach the production of a separate type air conditioner in the same production line.

SUMMARY OF THE INVENTION

The present invention is disclosed to solve the aforementioned problems, and accordingly it is an object of the present invention to provide a production line of air conditioner adapted to integrate production lines of indoor units and outdoor units to one work bench and to simultaneously produce indoor units and outdoor units on the same pallet for assembly and inspection, thereby reducing installation space and cost, and eliminating production time variation per line of indoor and outdoor units.

It is another object to have some of the same assembly processes applied to both the indoor and outdoor units, thereby reducing time.

It is a further object to have the same production line to produce both the indoor unit and the outdoor unit in order to reduce the space taken by the assembly line.

It is still another object to have a single lot of an indoor and outdoor unit complete at the same time, thus allowing for an equal number of indoor and outdoor units produced at the same time especially since both units are needed together for a functioning air conditioner.

It is another object in that production line variations per line are eliminated to shorten lot production time.

It is a further object in that performance inspection and finished product feeding and separation process are expedited and sectional inspection devices are integrated to decrease the installation cost.

In accordance with the objects of the present invention, there is provided a production line of an air conditioner, the production line mounted with a work bench for producing indoor units and outdoor units, the work bench including an outdoor work part and an indoor work part integrally installed and each part having a same length for a set of an indoor unit and an outdoor unit to be moved on one pallet for assembly and inspection.

In accordance with another object of the present invention, there is provided a production line of an air conditioner, the production line mounted with a work bench for producing indoor units and outdoor units, the work bench having a pallet supply section, an outdoor unit work part mounted at one side of the pallet supply section with a parts assembly section, refrigerant tube vacuum forming and refrigerant infusion section, refrigerant infusion tube removal section, control unit assembly section, refrigerant leakage inspection section, cabinet assembly section, packing section, forwarding and loading section in that order. An indoor unit work part is mounted at the other side of the pallet supply section with a first pallet feeding section, parts assembly section, noise inspection section, second pallet feeding section, packing section and forwarding and loading section in that order, and integrally installed from parts assembly section of the outdoor unit work part to cabinet assembly section. The performance inspection section mounted between the cabinet assembly section and packing section of the outdoor work part and also mounted between the second pallet feeding section and the packing section of the indoor unit work part is used for simultaneously inspecting the outdoor units and indoor units in performance thereof. The finished products feeding and separating section is mounted between the performance inspection section and packing section of the outdoor unit work part and also mounted between the performance inspection section and the packing section of the indoor unit work part for separating the outdoor units and indoor units from pallets and feeding the same.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
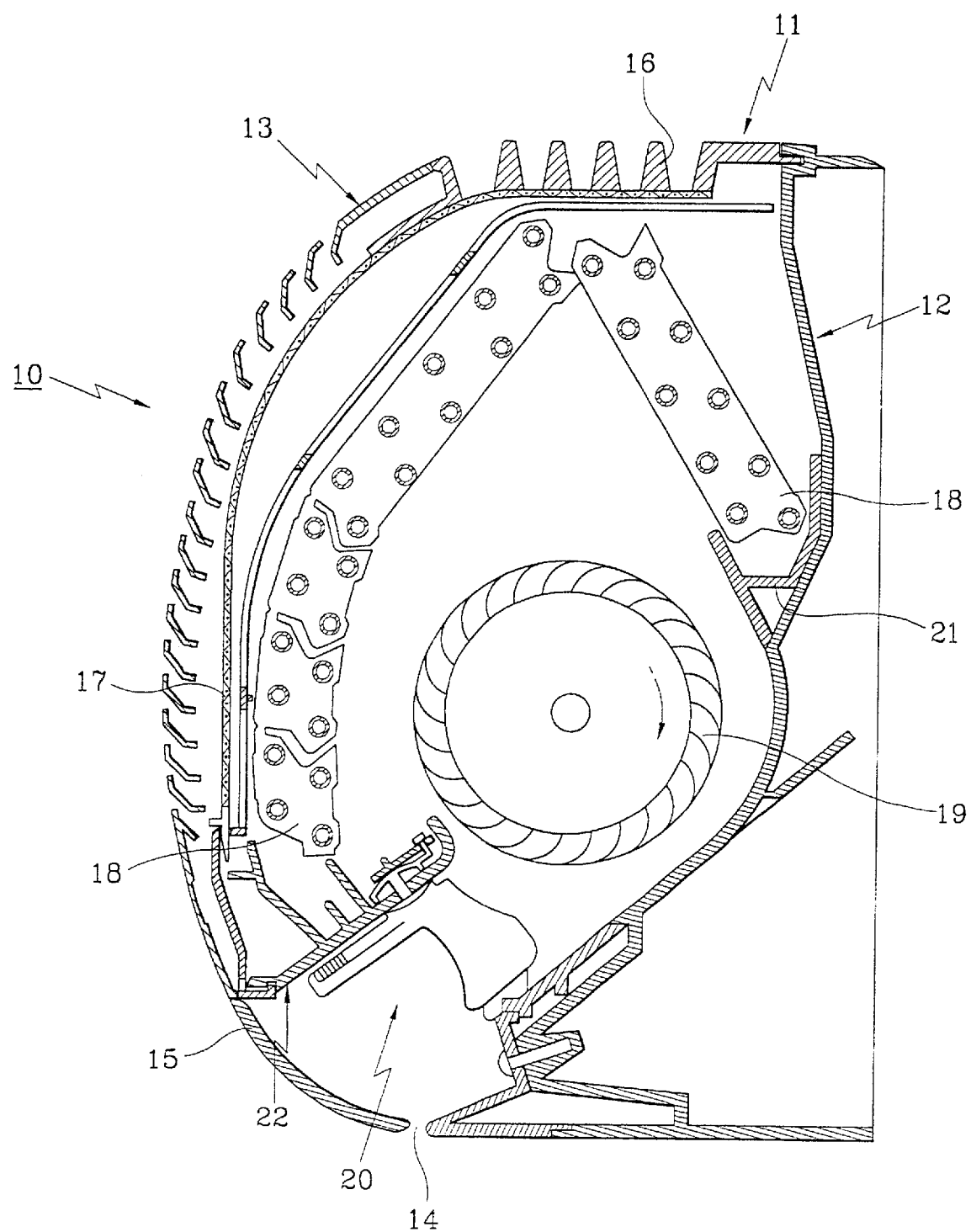
FIG. 1 is a sectional view for wholly illustrating an indoor unit.

Now turning to the drawings, as seen in FIG. 1, an air conditioner of the separation type has one component called the indoor unit 10 connected with another component called the outdoor unit 30. Specifically, the indoor unit 10 includes a front panel 11 and a rear panel 12 having an exterior look of the product, a front suction grille 13 mounted at a front side of the front panel for detachably and attachably opening and closing, vertical air control mechanism 15 installed at a lower discharge outlet 14 of the front panel 11 for discharging the air heat-exchanged by the indoor unit 10 into indoors and for vertically adjusting air flow, an air filter 17 arranged within the front panel 11 for filtering foreign objects floating in the air sucked through upper suction grille 16 and front suction grille 13 of the front panel 11, an evaporator 18 provided at a rear side of the air filter 17 for heat-exchanging the air, a cross flow fan 19 mounted at a rear side of the evaporator 18 for forcibly sucking and discharging the room air into the indoor unit 10, multiple horizontal air control mechanisms 20 disposed within the discharge outlet 14 for horizontally adjusting the air flow, and upper and lower gutters 21 and 22 mounted at both lower ends of the heat exchanger 18 for collecting concentrated water flowing down from the evaporator 18 and simultaneously discharging same.

Figure 2:
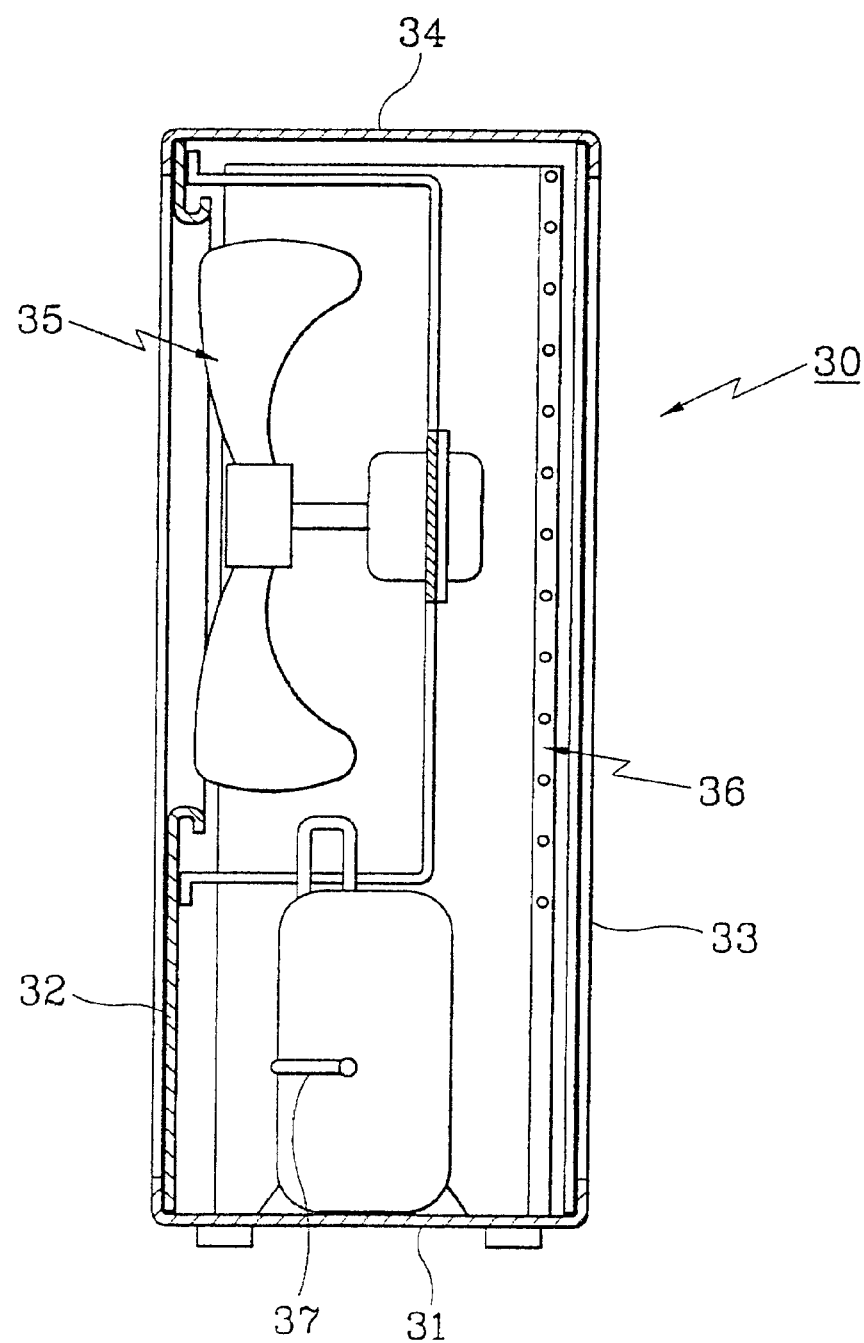
FIG. 2 is a sectional view for wholly illustrating an outdoor unit.

Meanwhile, the outdoor unit 30 includes, as illustrated in FIG. 2, a lower panel 31, a front panel 32, a rear panel 33 and an upper panel 34 inter-connected and forming an exterior look of the product, a propeller fan 35 disposed inside of the front panel 32 for forcibly sucking and discharging outdoor air into the outdoor unit 30, concentrator 36 mounted at an upper marginal side of the lower panel 31 to contact the outdoor air for-cooling the same, and a compressor 37 installed at an upper side of the lower panel 31.

The indoor 10 and the outdoor unit 30 are independently manufactured and assembled at their respective production lines. Specifically, the indoor unit 10 will have multiple work benches doing different aspects of the production of the indoor unit. The outdoor unit 30 will have a totally different production line with its own work benches performing specific tasks in producing the outdoor unit.

One problem, however, in having separate lines is the loss of space and cost used for having two separate production lines. Another problem is that the time to create each single lot of an indoor unit 10 and an outdoor unit 30 is increased because there is a variation in the time needed to produce an indoor unit 10 and an outdoor unit 30. If either an outdoor unit 30 or an indoor unit 10 is produced first, that unit must wait for the other type of unit to finish.

Figure 3:
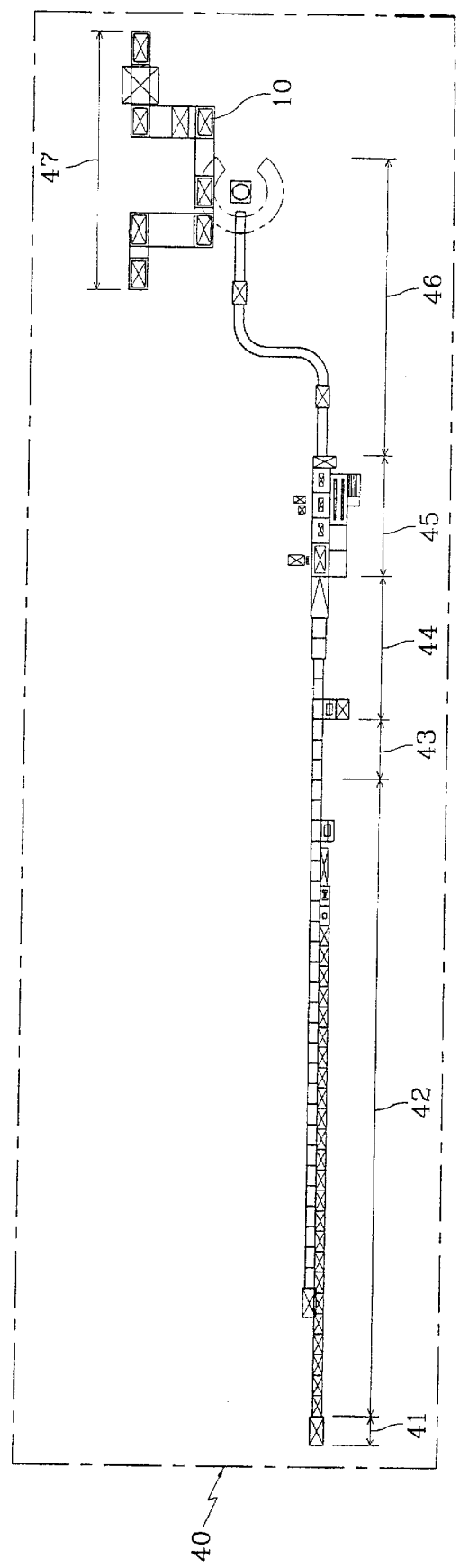
FIG. 3 is a schematic diagram for illustrating a production line of indoor units.
Figure 4:
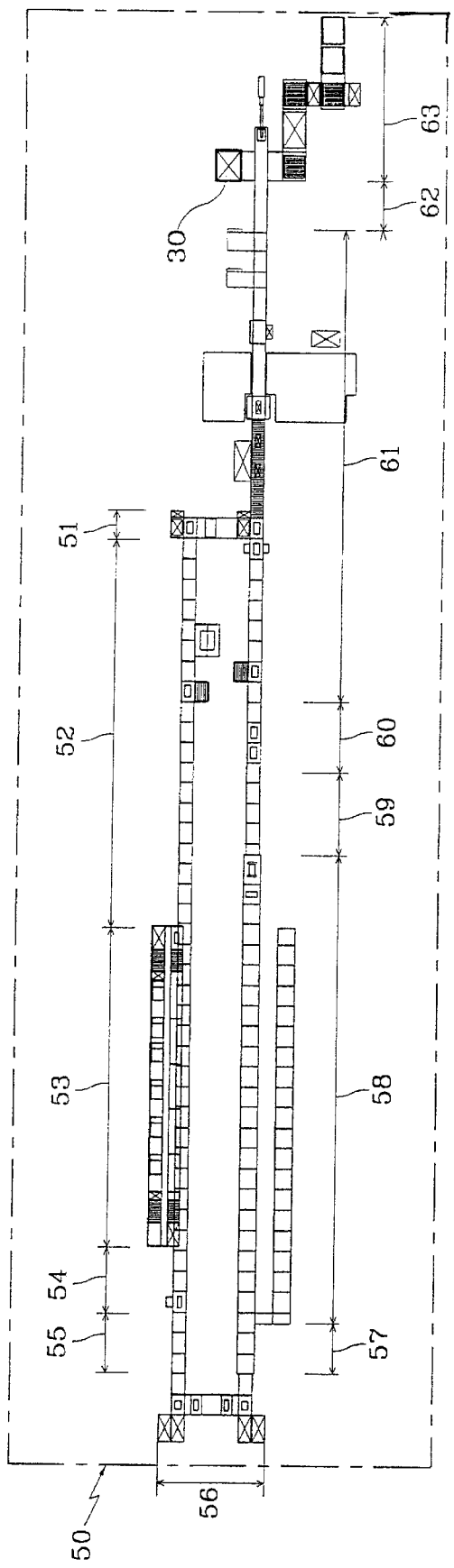
FIG. 4 is a schematic diagram for illustrating a production line of outdoor units.

FIGS. 3 and 4 show the indoor unit 10 and the outdoor unit 30 being independently manufactured and assembled at respective production lines. In other words, the production line of the indoor unit 10 has multiple work benches 40 connected in one line as illustrated in FIG. 3 and is partitioned in order of pallet supply section 41, parts assembly section 42 for assembling all the parts necessary for the indoor unit 10, noise inspection section 43, performance inspection section 44, packing section 45, finished product feeding section 46, forwarding and loading section 47, where a large number of workers are respectively manned at every section for dividing there among and producing the indoor units 10 on a pallet fed along the work bench 40.

Meanwhile, the production line of outdoor unit 30 has multiple work benches 50 connected in one line as illustrated in FIG. 4 and is partitioned in order of pallet supply section 51, parts assembly section 52, refrigerant tube vacuum forming section 53, refrigerant infusion section 54, refrigerant tube removing section 55, feeding section 56, refrigerant leakage inspection section 57, performance inspection section 58, cabinet assembly section 59, stability inspection section 60, packing section 61, finished product feeding section 62, forwarding and loading section 63, where a large number of workers are respectively manned at every section for dividing there among and producing the outdoor units 30 on a pallet fed along the work bench 50.

At this time, the parts assembly section 52 assembles inner parts of upper propeller fan 35 of base panel 31, concentrator 36, compressor 37 and the like. The performance inspection section 58 inspects consumed electricity necessary for cooling and heating, pressure inspection, temperature difference inspection, revolution of propeller fan 35 and the like. The stability inspection section 60 involves low voltages start inspection, withstand voltage inspection, insulation resistance inspection, grounding inspection, operation and noise inspection.

However, there is a problem in the production line of air conditioner according to the above thus described work, in that the work bench 40 of indoor unit 40 and the work bench of outdoor unit 30 are separately installed to greatly increase installation space and cost of respective work benches 40 and 50. There is another problem in that lot consisting time of indoor units 10 and outdoor units 30 produced per frequency is lengthened by production time variation for respective lines.

Figure 5:
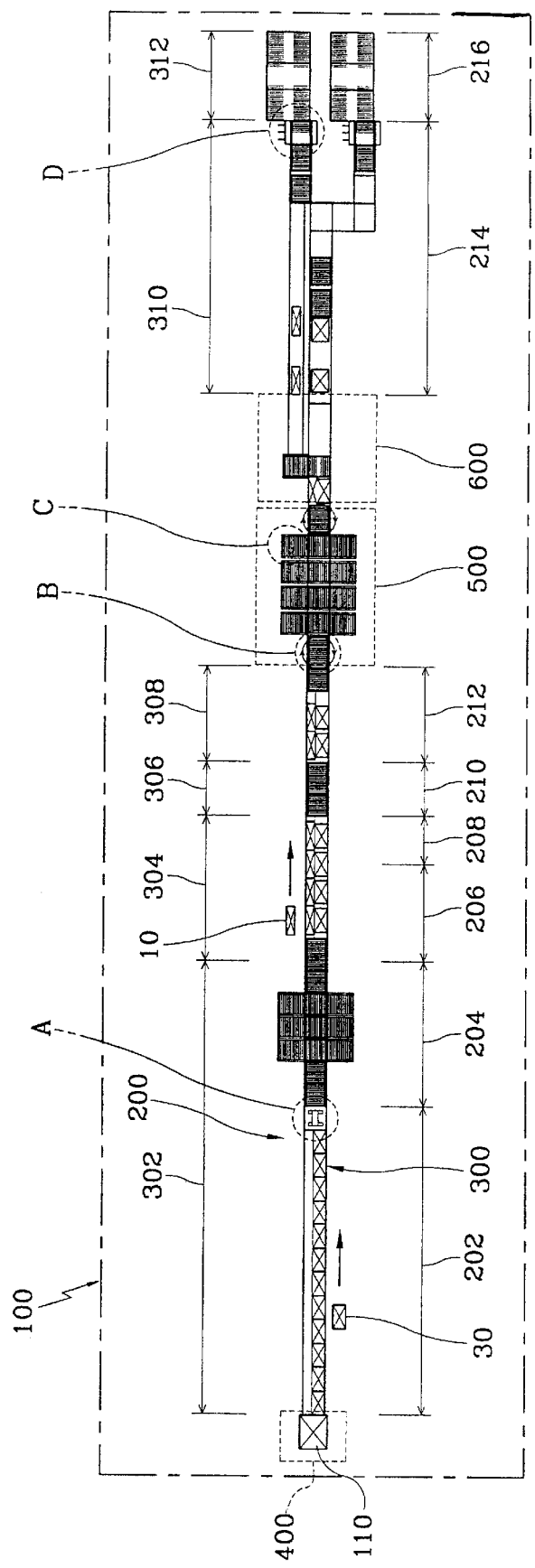
FIG. 5 is a schematic diagram for illustrating an integrated production line of indoor units and outdoor units according to the present invention.
Figure 6:
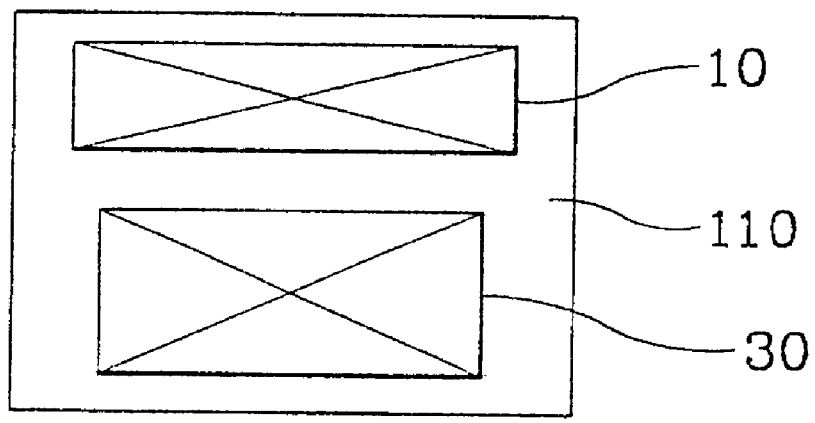
FIG. 6 is a plan view for illustrating an outdoor unit and an indoor unit simultaneously laid on a pallet according to the present invention.

A production line of air conditioners according to the present invention includes one work bench 100 for simultaneously manufacturing indoor units 10 and outdoor units 30, as illustrated in FIGS. 5 and 6. Specifically, the work bench 100 includes a pallet supply section 400 having the same length for putting outdoor unit 30 and indoor unit 10 simultaneously at front and rear sides of the same pallet 110 for assembly and inspection, an outdoor work part 200, an indoor work part 300, performance inspection section 500 and finished product feeding and separating section 600.

At this time, the pallet supply section 400 serves to supply and load multiple pallets 110 for simultaneously putting on the pallet 110 outdoor units 30 supplied to the outdoor work part 200 and indoor units 10 supplied to the indoor work part 300 for assembly and inspection.

The outdoor unit work part 200 are connected in order of parts assembly section 202, refrigerant tube vacuum forming and refrigerant infusion section 204, refrigerant infusion tube removal section 206, control unit assembly section 208, refrigerant leakage inspection section 210, cabinet assembly section 212, packing section 214, forwarding and loading section 216.

The parts assembly section 202 serves to assemble components other than front panel 32, rear panel 33, upper panel 34 and control unit (not shown) in the construction of the outdoor unit 30, that is, assemble propeller fan 35, concentrator 36, compressor 37 and the other inner parts to the base panel 31.

The refrigerant tube vacuum forming and refrigerant infusion section 204 extracts foreign objects, moisture and the like infiltrated into a pass line of a refrigerant tube (not shown) assembled at the parts assembly section 202 and concurrently vacuums inner part to infuse the refrigerant there into by way of vacuum pressure.

The refrigerant infusion tube removal section 206 removes a refrigerant infusion tube (not shown) separately connected to one side of a refrigerant tub for infusing refrigerant from the refrigerant pass line at the refrigerant tube vacuum forming and refrigerant infusion section 204 to thereafter seal an infusion inlet, for example, by way of welding.

The control unit assembly section 208 assembles a control unit excluded from assembly at the parts assembly section 202, that is, power supply apparatus (not shown) necessary for operation of the outdoor unit 30.

The refrigerant leakage inspection section 210 checks if there is any leakage of refrigerant at the pass line of the refrigerant tube (not shown) having passed the refrigerant tube vacuum forming and refrigerant infusion section 204 and refrigerant infusion tube removal section 206. The cabinet assembly section 212 assembles the front panel 32, rear panel 33 and the upper panel 34 excluded from assembly, while passing through the parts assembly section 202 and the control unit assembly section 208.

The packing section 214 receives the outdoor units 30 having passed the finished product feeding and separating section 600 for arrangement thereof and concurrently feeds the same for packing. The forwarding and loading section 216 loads in stacks the outdoor units having passed the packing section 214 and simultaneously helps forwarding thereof for feeding by way of separate transportation means.

Meanwhile, the indoor unit work part 300 is connected in order of first pallet feeding section 302, parts assembly section 304, noise inspection section 306, second pallet feeding section 308, packing section 310, and forwarding and loading section 312.

At this time, the first pallet feeding section 302 is lengthwise installed along where the parts assembly section 202 of the outdoor unit work part 200 and refrigerant tube vacuum forming and refrigerant infusion section 204 are combined, and feeds only the pallet 110 supplied from the pallet supply section 400 to the parts assembly section 304 to eliminate the production time difference per line of the indoor work part 300 and the outdoor unit work part 200.

The parts assembly section 304 assembles all the parts necessary for the indoor unit 10 and is installed opposite to a length where the refrigerant infusion tube removal section 206 of the outdoor work part 200 and the control unit assembly section 208 are combined.

The noise inspection section 306 inspects noise of the finished indoor unit 10 having passed the parts assembly section 304 and is installed opposite to a length where the refrigerant leakage inspection section 210 of the outdoor unit work part 200. The second pallet feeding section 308 is installed opposite to a length of the cabinet assembly section 212 of the outdoor unit part 200 and simultaneously feeds the pallet 110 supplied to the noise inspection section 306 to the performance inspection section 500 to thereby eliminate a production time difference per line of the indoor unit part 300 and the outdoor unit work part 200. In other words, the outdoor unit 30 and the indoor unit 10 simultaneously laid on the pallet 110 can be concurrently inspected in performance thereof at the performance inspection section 500.

The packing section 310 is installed opposite to a length of the packing section 214 of the outdoor unit work part 200 and receives the indoor unit 10 having passed the finished product feeding and separation section 600 for arrangement and feeding the same for packing at the same time. The forwarding and loading section 312 is mounted opposite to a length of the forwarding and loading section 216 at the outdoor unit work part 200 and loads in stacks of indoor units 10 having passed the packing section 310 and helps the indoor units 10 in moving by a separate transportation method.

Meanwhile, the performance inspection section 500 simultaneously inspects the outdoor units and the indoor units 10 in a finished state concurrently laid on the pallet 110 and moved to the performance inspection section 500.

In other words, the performance inspection section 500 performs low voltage start inspection, withstand voltage inspection, insulation resistance inspection, earth inspection, efficiency inspection at heating and cooling (consumed power inspection, pressure inspection, temperature difference inspection, etc.), revolution (rpm, revolutions per minute) inspection of propeller fan 35 and cross flow fan 19, operation and noise inspection of the outdoor unit 30 and indoor unit 10.

Furthermore, the finished product feeding and separating section 600 separates from the pallet 110 the outdoor unit 30 and indoor unit 10 simultaneously laid on the pallet 110 and having passed the performance inspection section 500, and feeds the same concurrently to the packing sections 214 and 310 partitioned per line.

In general, a reference letter A refers to a transitional stage like a lift while reference B refers to a rotatable work area. Reference letter C refers to a work area with rollers while reference D refers to a packing device.

Now, operational effects of the present invention thus constructed will be described.

As illustrated in FIG. 6, a plurality of empty pallets loaded at the pallet supply section 400 at the work bench 100 for producing outdoor units 30 and indoor units 10 are sequentially supplied to the outdoor unit work part 200 and the indoor unit work part 300 at a predetermined interval, such that the outdoor units 30 and the indoor units 10 are simultaneously assembled and inspected on upper surface of the pallet 110.

Now, production procedure of the outdoor units 30 is described.

When one side (front side) of the pallet 110 supplied from the pallet supply section 400 is fed along the parts assembly section 202 of the outdoor unit work part 200, waiting workers use one area relative to upper surface of the feeding pallet 110 to assemble parts necessary for construction of the outdoor unit 30.

At this time, several workers at the parts assembly section 202 are divided and sequentially assemble inner parts such as propeller fan 35, concentrator 36, compressor 37 and the like excluding the front panel 32, rear panel 33, upper panel 34 and the control unit (not shown), and when the pallet 110 having completed processes at the parts assembly section 202 is fed to the refrigerant tube vacuum forming and refrigerant infusion section 204, foreign objects or moisture and the like penetrated into the pass line of the refrigerant tube (not shown) are extracted and infused with refrigerant by vacuum pressure.

Furthermore, when the pallet 110 having completed processes at the refrigerant tube vacuum forming and refrigerant infusion section 204 is fed to the refrigerant infusion tube removal section 206, the outdoor unit 30 is removed of the refrigerant infusion tube (not shown) separately connected to one side of the refrigerant tube (not shown) for infusion of refrigerant by waiting workers, and infusion inlet is then closed, when the pallet 10 having finished the processes at the refrigerant infusion tube removal section 206 is transported to the control unit assembly section 208, the outdoor unit 30 is supplied with power supply apparatus (not shown) necessary for operation of the outdoor unit 30 by the workers waiting at the control unit assembly section 208.

Furthermore, when the pallet 110 is transported to the refrigerant leakage inspection section 210 after process is completed at the control unit assembly section 208, the outdoor unit 30 is checked on whether refrigerant is leaked from the pass line of the refrigerant tube (not shown) by the worker waiting at the refrigerant leakage inspection section 210. When the pallet 110 having finished the process at the refrigerant leakage inspection section 210 is fed to the cabinet assembly section 212, the outdoor unit 30 is assembled with the front panel 32, rear panel 33 and upper panel 34 necessary for forming an exterior look of the outdoor unit 30 by the workers waiting at the s cabinet assembly section 212 to complete all parts assembly necessary for the outdoor unit 30 and to become a finished product.

Successively, the finished product of the outdoor unit 30 is simultaneously transported to performance inspection section 500 by the pallet 110 along with the finished product of indoor unit 10 fed along the indoor unit work part 300 to be tested for performance by the waiting workers.

In other words, the outdoor unit 30 passes the process along with the indoor unit 10, where low voltage start inspection, withstand voltage inspection, insulation resistance inspection, ground inspection, efficiency inspection at cooling and heating operations (consumed power inspection, pressure inspection, temperature difference inspection and the like), revolution (rpm, revolutions per minute) inspection of propeller fan 35 and cross flow fan 19, operation and noise inspection and the like are performed. When the pallet 110 having completed the process at the performance inspection section 500 is transported to the finished product feeding and separation section 600, the outdoor unit 30 is respectively separated from the pallet 110 and the indoor unit 10 and is concurrently fed to the packing section 214 along a line of the outdoor unit work part 200 connected to one side of the finished product feeding and separation section 600.

At this time, the pallet 110 is separated from the outdoor unit 30 and the indoor unit 10 at a predetermined location of the finished product feeding and separation section 600 and is simultaneously supplied to the pallet supply section 400 along pallet return section (not shown) mounted at a lower line of the work bench 100 to be recycled.

Meanwhile, when the outdoor unit 30 having finished the process at the finished product feeding and separation section 600 is fed to the packing section 214, the outdoor unit 30 is packed with separate packing material (not shown) at the packing section 214, and the outdoor unit 30 having passed the packing process at the packing section 214 is moved to the forwarding and loading section 216 and is simultaneously loaded in stacks for forwarding process.

Next, production process of indoor unit 10 is described.

When the pallet 110 supplied from the pallet 110 supply section 400 is transported along the first pallet feeding section 302 of the indoor unit work part 300, the pallet 110 is fed in the state of the indoor unit 10 not being assembled while passing the first pallet feeding section 302, such that production time variation per line of the indoor unit work part 300 and the outdoor unit work part 200 can be adjusted while the outdoor unit 30 passes through the processes of parts assembly section 202, refrigerant tube vacuum forming and refrigerant infusion section 204 of the outdoor unit work part 200.

Furthermore, when the pallet 110 having passed the first pallet feeding section 302 is transported to the parts assembly section 304, the waiting workers use the other area relative to the upper surface of the moving pallet 110 to assemble parts necessary for construction of the indoor unit 10. In other words, all the parts necessary for construction of the indoor unit 10 are all divided and sequentially assembled by the several workers waiting at the parts assembly section 304 for becoming a finished product.

Meanwhile, when the pallet 110 having passed the process at the parts assembly section 304 is transported to the noise inspection section 306, the indoor unit 10 passes the process of being noise-tested by the workers waiting at the noise inspection section 306. When the pallet 110 having completed the process at the noise inspection section 306 is moved to the second pallet feeding section 308, the second pallet feeding section 308 adjusts a production time variation per line of the indoor unit work part 300 and the outdoor unit work part 200 while the outdoor unit 30 passes the process at the cabinet assembly section 212 of the outdoor unit work part 200.

Successively, the indoor unit 10 passes the process necessary for performance tests in the same way as the outdoor unit 30 has gone through in the performance inspection section 500, and when the pallet 110 having finished the process at the performance inspection section 500 is moved to the finished product feeding and separating section 600, the indoor unit 10 is respectively separated from the pallet 110 and from the outdoor unit 30 and is simultaneously fed to the packing section 310 along a line of the indoor unit work part 300 connected to one side of the finished product feeding and separation section 600.

At this time, the indoor unit 10 fed without the guide of the pallet 10 to the packing section 310 passes the process where the indoor unit 10 is packed by separate packing material (not shown) at the packing section 310, while the indoor unit 10 having gone through the packing process at the packing section 310 is moved to the forwarding and loading section 312 and is simultaneously loaded in stacks for forwarding preparation.

Accordingly, because the indoor unit work part 300 has fewer assembly line steps than the outdoor unit work part 200, the first pallet feeding section 302 is installed between the pallet supply section 400 and the parts assembly section 304, and at the same time, the second pallet feeding section 308 is mounted between the noise inspection section 306 and the performance inspection section 500. Therefore, a production time variation per liner of the indoor unit work part 300 and the outdoor unit work part 200 is eliminated to thereby enabling the indoor unit work part 300 and the outdoor unit work part 200 to maintain the same time for finishing.

Furthermore, the work bench 100 has the outdoor unit work part 200 and the indoor unit work part 300 integrated in one piece to face each other from an assembly process to an inspection process, and has made it possible to simultaneously assemble and inspect the outdoor unit 30 and the indoor unit 10 on one pallet 110, thereby reducing installation space and cost of the work bench 100.

Still furthermore, the pallet supply section 400, performance inspection section 500, finished product feeding and separation section 600 can share the work bench 100 to expedite the performance inspection and finished product feeding and separating process and to eliminate sectional inspection devices (not shown), thereby reducing installation cost thereof.

As apparent from the foregoing, there is an advantage in the production line of air conditioner thus described according to the present invention in that outdoor unit and indoor unit product lines are integrated in one work bench to enable the outdoor units and indoor units to be assembled and inspected on a same pallet, thereby reducing installation space and cost thereof. There is another advantage in that production line variations per liner are eliminated to shorten lot consisting time. There is still another advantage in that performance inspection and finished product feeding and separation process are expedited and sectional inspection devices (not shown) are integrated to decrease the installation cost.

What is claimed is:

1. A production line of an air conditioner, comprising a work bench accommodating mass-producing indoor units and outdoor units of an air conditioner, said work bench comprising:

a pallet supply section;

an outdoor work part accommodating mass-production of the outdoor units, said outdoor unit work part mounted at one side of the pallet supply section with a parts assembly section, refrigerant tube vacuum forming and refrigerant infusion section, refrigerant infusion tube removal section, control unit assembly section, refrigerant leakage inspection section, cabinet assembly section, packing section, forwarding and loading section in that order;

an indoor work part accommodating mass-production of the indoor units being integrally installed with said outdoor work part, each one of said outdoor work part and indoor work part having a same length accommodating a set of an indoor unit and an outdoor unit to be moved on one pallet accommodating assembly and inspection, said indoor unit work part mounted at the other side of the pallet supply section with first pallet feeding section, parts assembly section, noise inspection section, second pallet feeding section, packing section and forwarding and loading section in that order, and integrally installed from parts assembly section of said outdoor unit work part to cabinet assembly section;

a performance inspection section mounted between the cabinet assembly section and a packing section of said outdoor work part and also mounted between the second pallet feeding section and the packing section of said indoor unit work part for simultaneously inspecting the outdoor units and indoor units in performance thereof; and a finished products feeding and separating section mounted between the performance inspection section and the packing section of said outdoor unit work part and also mounted between the performance inspection section and the packing section of said indoor unit work part accommodating separating the outdoor units and indoor units from pallets and feeding the outdoor units and the indoor units.

2. The production line of claim 1, wherein a length where the parts assembly section, refrigerant tube vacuum forming and refrigerant infusion section of said outdoor unit work part are combined while maintaining the same length as that of the first pallet feeding section of said indoor unit work part, both lengths facing each other.

3. The production line of claim 1, wherein a length where refrigerant infusion tube removal section and control unit assembly section of said outdoor unit work part are combined while maintaining the same length as that of the parts assembly section of said indoor unit work part, both lengths facing each other.

4. The production line of claim 1, wherein a length where the refrigerant leakage inspection section and cabinet assembly section of said outdoor unit work part are combined while maintaining the same length as that of the noise inspection section of indoor unit work part and the second pallet feeding section respectively, both lengths facing each other.

5. The production line of claim 1, wherein a length where the packing section and forwarding and loading section of said outdoor work part maintains the same length as that of the packing section and forwarding and loading section of said indoor unit work part respectively, both lengths facing each other.

6. The production line of claim 1, wherein the finished product feeding and separating section is constructed to return to the pallet supply section where the outdoor unit and indoor unit are separated.

7. The production line of claim 1, wherein the packing section and the forwarding and loading section of said outdoor unit work part are separated from the packing section and the forwarding and loading section of said indoor unit work part at a predetermined interval, both sections of said outdoor unit work part and said indoor unit work part facing one another.

8. A production line of an air conditioner, comprising:

a pallet supply section serving to supply and load a plurality of pallets accommodating simultaneously putting on the pallet a plurality of outdoor units and indoor units of an air conditioner accommodating assembly and inspection;

a first portion connected to said pallet supply section and transporting both the indoor and outdoor units of an air conditioner, on a first side of said first portion having disposed the indoor unit and on a second side of said first portion having disposed the outdoor unit, the first side transporting the indoor unit through a first pallet feeding section, the second side having first a parts assembly section and then a refrigerant tube vacuum forming and refrigerant infusion section of the outdoor unit;

a second portion connected after said first portion, said second portion having on a first side a parts assembly section of the indoor unit and on the second side of said second portion having first a refrigerant infusion tube removal section and then a control unit assembly section of the outdoor unit;

a third portion connected after said second portion and having on a first side a noise inspection section of the indoor unit and on a second side a refrigerant leakage inspection section of the outdoor unit;

a fourth portion connected after said third portion, said fourth portion having on a first side a second pallet feeding section transporting forward the indoor unit and on a second side of said fourth portion having a cabinet assembly section of the outdoor unit;

a fifth portion connected after said fourth portion and accommodating performance inspection of both the indoor and outdoor unit simultaneously;

a sixth portion connected after said fifth portion and accommodating feeding and separating finished assembly of the indoor and outdoor units;

a seventh portion connected after said sixth portion and having a packing section of the indoor unit on a first side of said seventh portion and having a packing section of the outdoor unit on a second side of said seventh portion; and an eighth portion connected after said seventh portion having a forwarding and packing section of the indoor unit on a first side of said eighth portion and a forwarding and packing section of the outdoor unit on a second side of said eighth portion.

9. The production line of claim 8, wherein the second pallet feeding section of said fourth portion adjusts a production time variation per line of the indoor unit and the outdoor unit while the outdoor unit passes the process at the cabinet assembly section of said fourth portion.

10. The production line of claim 9, wherein the parts assembly section comprises assembly of a propeller fan, concentrator, compressor to a base panel in the outdoor unit.

11. The production line of claim 10, wherein the refrigerant tube vacuum forming and refrigerant infusion section of said first portion extracts foreign objects and moisture in a pass line of a refrigerant tube of the outdoor unit.

12. The production line of claim 11, wherein:
the refrigerant leakage inspection section checks a leakage of refrigerant at the pass line of the refrigerant tube of the outdoor unit; and
the cabinet assembly section assembling a front panel and rear panel to the lower panel and an upper panel to the front and rear panel of the outdoor unit.

13. The production line of claim 12, wherein: the indoor unit further comprising:
a front panel having a front suction grille mounted on a front side detachably and attachably opening and closing;
air control mechanisms installed at a lower portion of said front panel discharging air heat-exchanged by the indoor unit and accommodating the direction of the air flow;
an air filter arranged within the front panel filtering foreign objects; a front suction grill disposed on the front panel having intake of indoor air filtered by the air filter;
an evaporator disposed at a rear side of the air filter accommodating heat-exchanging the air; and
a cross flow fan mounted on a rear side of the evaporator forcibly suctioning and discharging the indoor room air into the indoor unit; and
the outdoor unit comprising:
a lower panel;
a concentrator mounted at an upper marginal side of the lower panel contacting an outdoor air;
a compressor installed at an upper side of the lower panel;
a rear panel connected to the lower panel;
a front panel connected to the lower panel;
a propeller fan disposed inside the front panel forcibly suctioning and discharging outdoor air into the outdoor unit; and
an upper panel connected to the rear panel and the front panel enclosing the outdoor unit.

14. The production line of claim 13, wherein said pallet supply section having the same length accommodating the outdoor unit and the indoor unit simultaneously at front and rear sides of the same pallet accommodating assembly and inspection.

15. A method, comprising the steps of:
supplying and loading a plurality of pallets from a pallet supply section accommodating simultaneously putting on the same pallet an outdoor unit and an indoor unit of an air conditioner accommodating assembly and inspection;

transporting both the indoor and outdoor units on a first portion connected with said pallet supply section and, on a first side of said first portion having disposed the indoor unit and on a second side of said first portion having disposed the outdoor unit, the first side transporting the indoor unit through a first pallet feeding section, the second side having first a parts assembly section and then a refrigerant tube vacuum forming and refrigerant infusion section of the outdoor unit;

connecting a second portion after said first portion, said second portion having on a first side a parts assembly section of the indoor unit and on the second side of said second portion having first a refrigerant infusion tube removal section and then a control unit assembly section of the outdoor unit, connecting a third portion after said second portion and having on a first side a noise inspection section of the indoor unit and on a second side a refrigerant leakage inspection section of the outdoor unit;

connecting a fourth portion after said third portion, said fourth portion having on a first side a second pallet feeding section transporting forward the indoor unit and on a second side of said fourth portion having a cabinet assembly section of the outdoor unit;

connecting a fifth portion after said fourth portion and accommodating performance inspection of both the indoor and outdoor unit simultaneously;

connecting a sixth portion after said fifth portion and accommodating feeding and separating finished assembly of the indoor and outdoor units;

connecting a seventh portion after said sixth portion and having a packing section of the indoor unit on a first side of said seventh portion and having a packing section of the outdoor unit on a second side of said seventh portion; and connecting an eighth portion after said seventh portion having a forwarding and packing section of the indoor unit a first side of said eighth portion and a forwarding and packing section of the outdoor unit on a second side of said eighth portion.

16. The method of claim 15, wherein the second pallet feeding section of said fourth portion adjusts a production time variation per line of the indoor unit and the outdoor unit while the outdoor unit passes the process at the cabinet assembly section of said fourth portion.

17. The method of claim 16, wherein the parts assembly section of said first portion comprises assembly of a propeller fan, concentrator, compressor to a base panel in the outdoor unit.

18. The method of claim 17, wherein the refrigerant tube vacuum forming and refrigerant infusion section of said first portion extracts foreign objects and moisture in a pass line of a refrigerant tube of the outdoor unit.

19. The method of claim 18, wherein:

the refrigerant leakage inspection section checks a leakage of refrigerant at the pass line of the refrigerant tube of the outdoor unit; and the cabinet assembly section assembling a front panel and rear panel to the lower panel and an upper panel to the front and rear panel of the outdoor unit.

20. A production line of an air conditioner, comprising a work bench accommodating mass-producing indoor units and outdoor units of an air conditioner, said work bench comprising:

an outdoor work part accommodating mass-production of the outdoor units;

an indoor work part accommodating mass-production of the indoor units being integrally installed with said outdoor work part, each one of said outdoor work part and indoor work part having a same length accommodating a set of an indoor unit and an outdoor unit to be moved on one pallet accommodating assembly and inspection;

a pallet supply section serving to supply and load a plurality of pallets accommodating simultaneously putting on the pallet a plurality of outdoor units and indoor units of the air conditioner accommodating assembly and inspection;

a first portion connected to said pallet supply section and transporting both the indoor and outdoor units of an air conditioner, on a first side of said first portion having disposed the indoor unit and on a second side of said first portion having disposed the outdoor unit, the first side transporting the indoor unit through a first pallet feeding section, the second side having first a parts assembly section and then a refrigerant tube vacuum forming and refrigerant infusion section of the outdoor unit; and a second portion connected after said first portion, said second portion having on a first side a parts assembly section of the indoor unit and on the second side of said second portion having first a refrigerant infusion tube removal section and then a control unit assembly section of the outdoor unit, said outdoor work part comprising the first side of said first portion and second portion, said indoor work part comprising the second side of said first portion and said second portion.

21. The production line of claim 9, with a work bench accommodating mass-producing indoor units and outdoor units of the air conditioner, comprising:

an indoor work part accommodating mass-production of the indoor units comprises the first side of said first, second, third, fourth, seventh, and eighth portion; and an outdoor work part accommodating mass-production of the outdoor units comprises the second side of said first, second, third, fourth, seventh, and eighth portion, said outdoor work part being integrally installed with said indoor work part, each one of said indoor work part and outdoor work part having a same length accommodating a set of indoor units and outdoor units to be moved on one pallet accommodating assembly and inspection.

22. The method of claim 15, with a work bench accommodating mass-producing indoor units and outdoor units of the air conditioner, comprising:

an indoor work part accommodating mass-production of the indoor units comprises the first side of said first, second, third, fourth, seventh, and eighth portion; and an outdoor work part accommodating mass-production of the outdoor units comprises the second side of said first, second, third, fourth, seventh, and eighth portion, said outdoor work part being integrally installed with said indoor work part, each one of said indoor work part and outdoor work part having a same length accommodating a set of indoor units and outdoor units to be moved on one pallet accommodating assembly and inspection.

* * * * *